US010366233B1

(12) United States Patent
Feinman et al.

(10) Patent No.: US 10,366,233 B1
(45) Date of Patent: Jul. 30, 2019

(54) SYSTEMS AND METHODS FOR TRICHOTOMOUS MALWARE CLASSIFICATION

(71) Applicant: Symantec Corporation, Mountain View, CA (US)

(72) Inventors: Reuben Feinman, Mountain View, CA (US); Javier Echauz, Alpharetta, GA (US); Andrew B. Gardner, Roswell, GA (US)

(73) Assignee: Symantec Corporation, Mountain View, CA (US)

( * ) Notice: Subject to any disclaimer, the term of this patent is extended or adjusted under 35 U.S.C. 154(b) by 127 days.

(21) Appl. No.: 15/356,526

(22) Filed: Nov. 18, 2016

(51) Int. Cl.
| | |
|---|---|
| H04L 29/06 | (2006.01) |
| G06F 21/56 | (2013.01) |
| G06N 7/00 | (2006.01) |
| G06N 20/00 | (2019.01) |

(52) U.S. Cl.
CPC ........... G06F 21/564 (2013.01); G06N 7/005 (2013.01); G06N 20/00 (2019.01)

(58) Field of Classification Search
CPC ....... G06F 21/56; G06F 21/564; H04L 63/14; H04L 63/145; H04L 29/06877; H04W 12/10; H04W 12/11; H04W 12/12; G06N 7/005; G06N 99/005
USPC ......................................................... 726/23
See application file for complete search history.

(56) References Cited

U.S. PATENT DOCUMENTS

| | | | | |
|---|---|---|---|---|
| 2008/0263669 | A1* | 10/2008 | Alme | G06F 21/56 726/24 |
| 2016/0078225 | A1* | 3/2016 | Ray | G06F 21/554 726/23 |
| 2017/0076198 | A1* | 3/2017 | Jin | G06N 99/005 |
| 2017/0351948 | A1* | 12/2017 | Lee | G06N 3/04 |

OTHER PUBLICATIONS

Leischnig et al, A Comparison of Contact Distribution Representations for Learning to Predict Object Interactions, Date of conferece: Nov. 3-5, 2015, Seoul, Korea.*
Liang, Machine Learning Application in MOOCs: Dropout Prediction , The 11th International Conference on Computer Science & Education (ICCSE 2016), Aug. 23-25, 2016. Nagoya University, Japan.*
Srivastava et al, Dropout: A Simple Way to Prevent Neural Networks from Overftting, Date: Jun. 2014.*

(Continued)

*Primary Examiner* — Ali S Abyaneh
(74) *Attorney, Agent, or Firm* — FisherBroyles, LLP (57) ABSTRACT

The disclosed computer-implemented method for trichotomous malware classification may include (1) identifying a sample potentially representing malware, (2) selecting a machine learning model trained on a set of samples to distinguish between malware samples and benign samples, (3) analyzing the sample using a plurality of stochastically altered versions of the machine learning model to produce a plurality of classification results, (4) calculating a variance of the plurality of classification results, and (5) classifying the sample based at least in part on the variance of the plurality of classification results. Various other methods, systems, and computer-readable media are also disclosed.

20 Claims, 6 Drawing Sheets

(56) References Cited

OTHER PUBLICATIONS

"Feature Scaling" https://web.archive.org/web/20160903064354/ https://en.wikipedia.org/wiki/Feature_scaling , May 22, 2018.*
Dadkhahi et al,Masking Strategies for Image Manifolds, Date of Publication: Jul. 7, 2016.*
Dahl; Large-Scale Malware Classification Using Random Projections and Neural Networks; May 26, 2013.
Pascanu; Malware Classification with Recurrent Networks; on or before Aug. 6, 2015.
Saxe; Deep Neural Network Based Malware Detection Using Two Dimensional Binary Program Features; Sep. 3, 2015.
Davis; Deep Learning on Disassembly Data; on or before Aug. 6, 2015.
Gal; What My Deep Model Doesn't Know . . . ; Jul. 3, 2015.
Meinshausen; Quantile Regression Forests; on or before Dec. 1, 2006.
Name and methods for classification with 'unknown' as acceptable result; http://stats.stackexchange.com/questions/133552/name-and-methods-for-classification-with-unknown-as-acceptable-result, as retrieved on Dec. 7, 2016; Jan. 15, 2015.

\* cited by examiner

SYSTEMS AND METHODS FOR TRICHOTOMOUS MALWARE CLASSIFICATION

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems.

Many security software companies attempt to combat malware by creating and deploying malware signatures. These signatures may match patterns observed in malware code and/or malware behavior. However, malware authors may regularly modify their malware in an attempt to circumvent commonly employed signature-based malware-detection mechanisms. In particular, in an attempt to evade detection, malware authors may refine malware such that it becomes difficult to distinguish from legitimate programs.

Accordingly, security software companies may face serious tradeoffs. Each new malware signature poses the risk of generating a false positive (i.e., incorrectly classifying legitimate software as malware). False positives can be particularly disruptive to consumers and businesses when security software takes action against legitimate software. On the other hand, false negatives may allow malware to pass undetected.

Accordingly, the instant disclosure identifies and addresses a need for additional and improved systems and methods for trichotomous malware classification.

SUMMARY

As will be described in greater detail below, the instant disclosure describes various systems and methods for trichotomous malware classification. As will be explained in greater detail below, in some examples the systems and methods described herein may analyze potential malware by analyzing the potential malware using multiple stochastically altered versions of a machine learning model to generate classification results, calculating the variance in the classification results, and then classifying the potential malware based at least in part on the variance.

In one example, a computer-implemented method for trichotomous malware classification may include (i) identifying a sample potentially representing malware, (ii) selecting a machine learning model trained on a set of samples to distinguish between malware samples and benign samples, (iii) analyzing the sample using a group of stochastically altered versions of the machine learning model to produce a group of classification results, (iv) calculating a variance of the classification results, and (v) classifying the sample based at least in part on the variance of the classification results.

In some examples, the computer-implemented method may further include performing a security action in response to classifying the sample.

In some examples, classifying the sample based at least in part on the variance of the classification results may include classifying the sample as an uncertain sample rather than as a malware sample or a benign sample based on the variance exceeding a predetermined threshold.

In some examples, classifying the sample based at least in part on the variance of the classification results may include (i) analyzing the sample using the machine learning model to produce a probability that the sample is a malware sample and (ii) determining that the probability that the sample is a malware sample falls within a probability window that is defined at least in part based on the variance of the classification results.

In one embodiment, the machine learning model may include a neural network. In some examples, training the neural network may include applying dropout regularization when training the neural network.

In some examples, analyzing the sample using the stochastically altered versions of the machine learning model to produce the classification results may include generating the stochastically altered versions of the machine learning model by applying, for each stochastically altered version of the machine learning model within the stochastically altered versions of the machine learning model, a dropout mask randomly generated for the stochastically altered version of the machine learning model.

In one embodiment, the machine learning model may include a gradient tree boosting model. In some examples, analyzing the sample using the stochastically altered versions of the machine learning model to produce the classification results may include generating the stochastically altered versions of the machine learning model by, for each stochastically altered version of the machine learning model within the stochastically altered versions of the machine learning model, randomly masking a subset of features within the stochastically altered version of the machine learning model.

In one embodiment, the machine learning model may include a random forest model. In some examples, analyzing the sample using the stochastically altered versions of the machine learning model to produce the classification results may include: normalizing each feature within the random forest model to have zero mean and to have unit variance and for each stochastically altered version of the machine learning model within the stochastically altered versions of the machine learning model, randomly determining, for at least one split, to replace the use of a feature at the split with the use of a different feature within the machine learning model.

In one embodiment, a system for implementing the above-described method may include (i) an identification module, stored in memory, that identifies a sample potentially representing malware, (ii) a selection module, stored in memory, that selects a machine learning model trained on a set of samples to distinguish between malware samples and benign samples, (iii) an analysis module, stored in memory, that analyzes the sample using a group of stochastically altered versions of the machine learning model to produce a group of classification results, (iv) a calculation module, stored in memory, that calculates a variance of the classification results, (v) a classifying module, stored in memory, that classifies the sample based at least in part on the variance of the classification results, and (vi) at least one physical processor configured to execute the identification module, the selection module, the analysis module, the calculation module, and the classifying module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a sample potentially representing malware, (ii) select a machine learning model trained on a set of samples to distinguish between malware samples and benign samples, (iii) analyze the sample using a group of stochastically altered versions of the machine learning model to produce a group of classification results, (iv) calculate a variance of the classification results, and (v) classify the sample based at least in part on the variance of the classification results.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for trichotomous malware classification. As will be explained in greater detail below, by analyzing the potential malware using multiple stochastically altered versions of a machine learning model to generate classification results, calculating the variance in the classification results, and then classifying the potential malware based at least in part on the variance, the systems and methods described herein may account for uncertainty in malware classification results (and thereby, e.g., reducing false negatives and false positives in malware classification) while also accounting for certainty (and thereby, e.g., maintaining true negatives and true positives in malware classification even while reducing false negatives and false positives).

For example, the systems and methods described herein may classify potential malware as "malicious," "benign," or "uncertain." By classifying a sample as "uncertain" based at least partly on the variance observed across classification results when the sample is used as input for multiple stochastically altered versions of a machine learning model (instead of, e.g., simply using the original machine learning model to probabilistically classify the sample and determining that the probabilistic classification result falls into a fixed window of intermediate probability), the systems described herein may (i) prevent the classification of malware as "malicious" or "benign" based on strong (e.g., highly favoring "malicious" over "benign" or vice versa) but uncertain (e.g., where strong results may be due to overfitting) results while (ii) preventing the classification of malware as "uncertain" based on results that are slightly less strong (e.g., clearly favoring, but not absolutely indicating, "malicious" over "benign" or vice versa) but highly certain (e.g., with confidence in the classification results themselves).

By accurately and robustly accounting for uncertainty in malware classification results, the systems and methods described herein may improve the functioning of a computing device in various ways. For example, the systems and methods described herein may increase the number of true positives and reduce the number of false negatives in malware classification and thereby reduce the negative impact of malware on the functioning of a computing device (e.g., in terms of reliability, stability, performance, security, and/or expected operation) by protecting the computing device against malware and/or remediating malware infections. In addition, these systems and methods may reduce the number of false positives and increase the number of true negatives in malware classification and thereby reduce the negative impact of aggressive security operations on the functioning of a computing device (e.g., by preventing security operations from interfering with legitimate programs, by reducing computing resources expended on unnecessary security operations, and/or by reducing security restrictions that may make the operation of a computing device more cumbersome and/or less responsive). Furthermore, these systems and methods may improve the functioning of a computing device and security systems operating in concert with a computing device by performing additional and/or more extensive security scans and/or protections in response to uncertain classifications (and thereby, e.g., improving the security of the computing device) while avoiding additional and/or more extensive security scans and/or protections in response to certain classifications (and thereby, e.g., reducing the system-level computational burden imposed on a computing device by security systems and thus freeing computing resources for primary applications operating on the computing device). In some examples, the systems and methods described herein may improve the functioning of a computing device by reducing the computing resources expended on analyzing malware samples and, thereby, freeing computing resources for the computing device to perform primary functions rather than system-level security functions.

Figure 1:
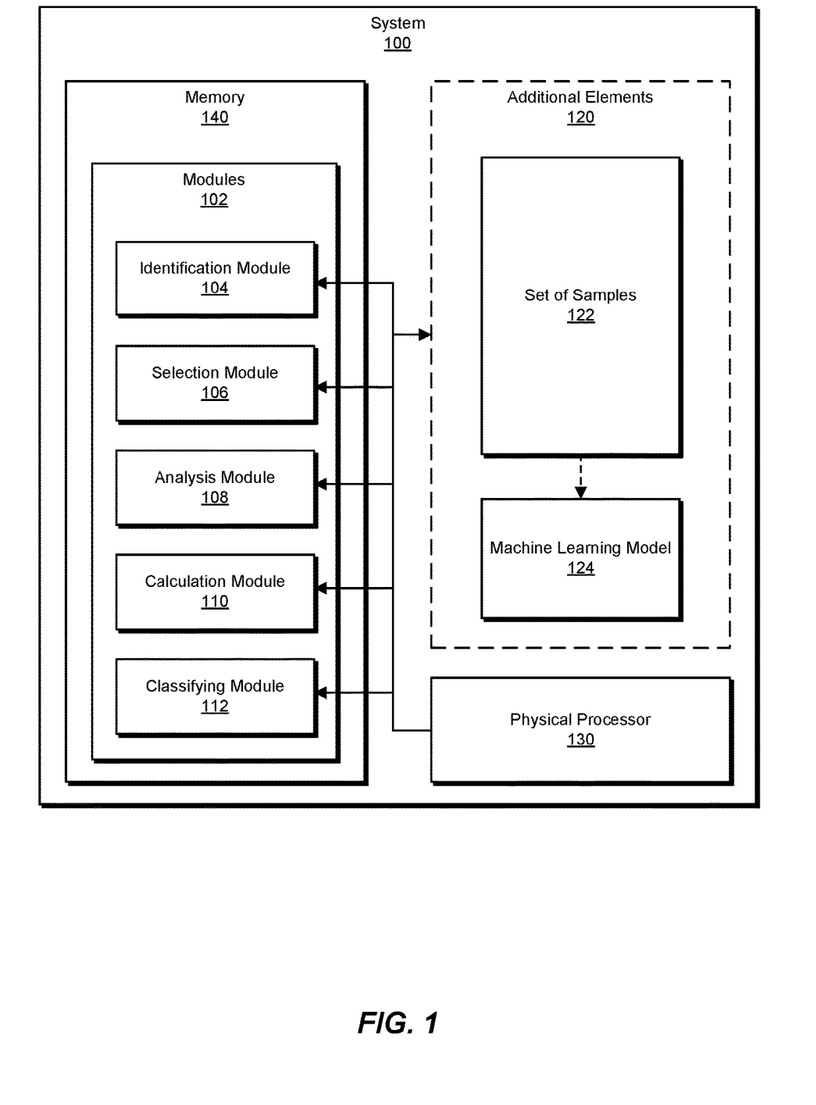
FIG. 1 is a block diagram of an example system for trichotomous malware classification.
Figure 2:
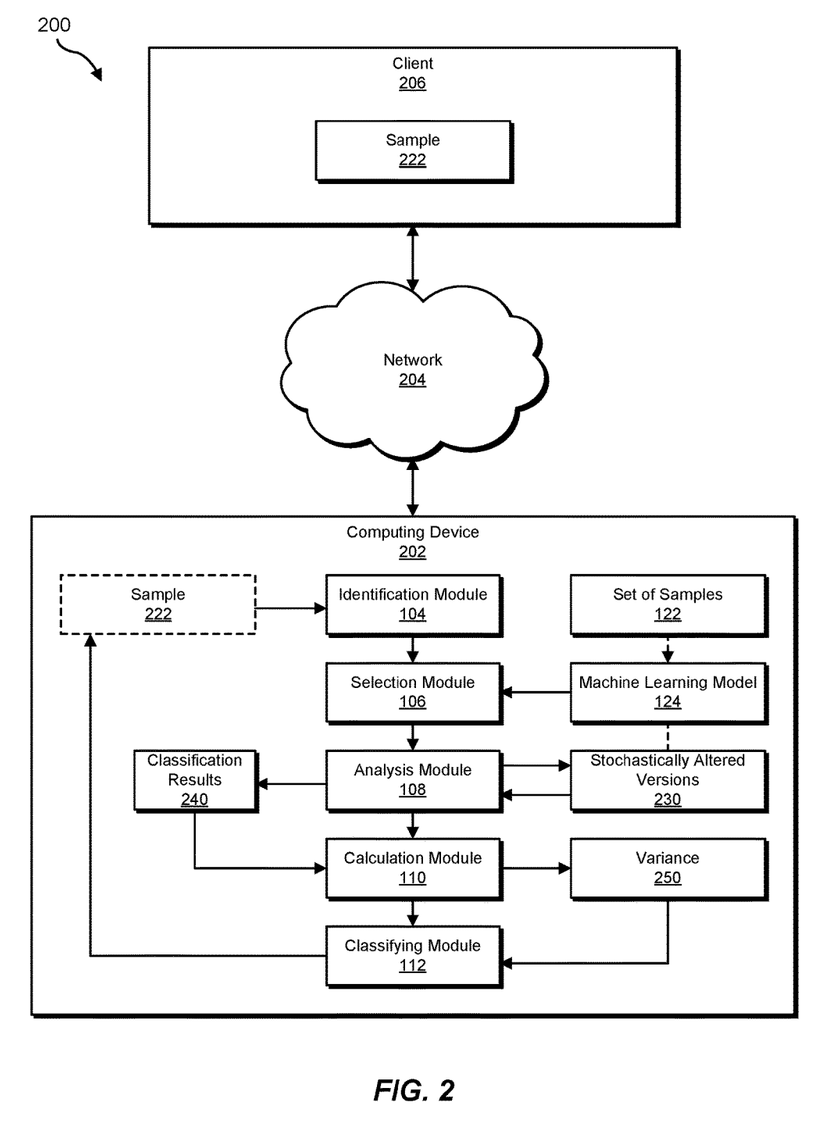
FIG. 2 is a block diagram of an additional example system for trichotomous malware classification.
Figure 3:
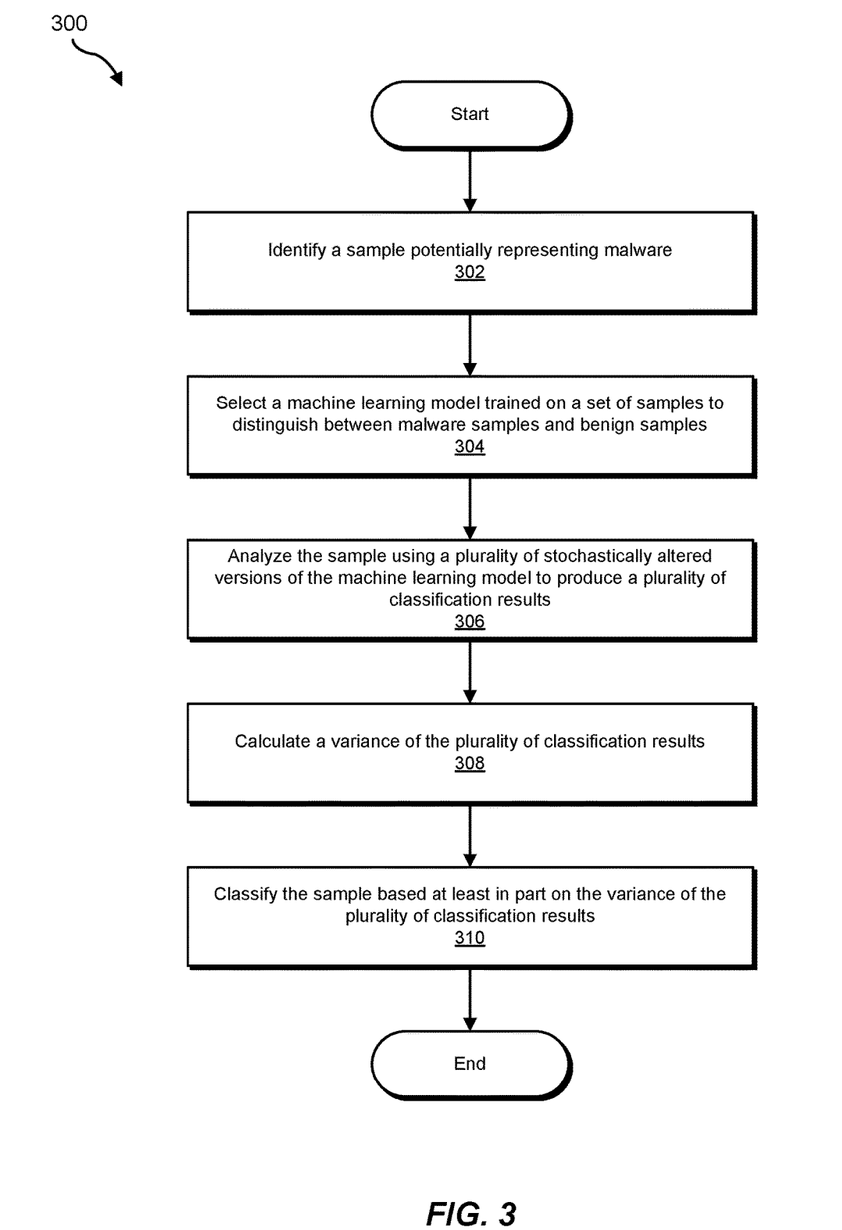
FIG. 3 is a flow diagram of an example method for trichotomous malware classification.
Figure 4:
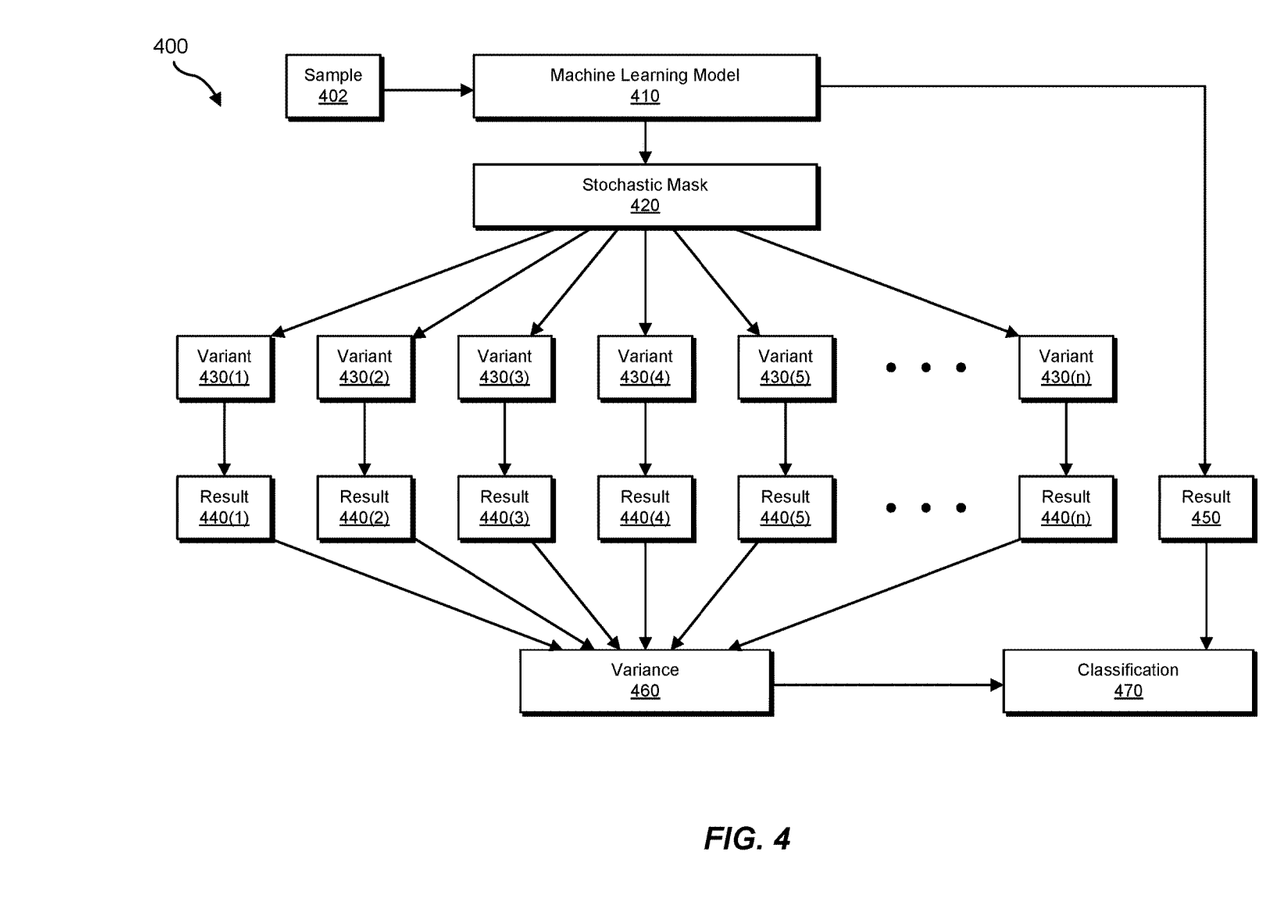
FIG. 4 is a block diagram of an example computing system for trichotomous malware classification.

The following will provide, with reference to FIGS. 1, 2, and 4, detailed descriptions of example systems for trichotomous malware classification. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of example system 100 for trichotomous malware classification. As illustrated in this figure, example system 100 may include one or more modules 102 for performing one or more tasks. For example, and as will be explained in greater detail below, example system 100 may include an identification module 104 that identifies a sample potentially representing malware. Example system 100 may additionally include a selection module 106 that selects a machine learning model trained on a set of samples to distinguish between malware samples and benign samples. Example system 100 may also include an analysis module 108 that analyzes the sample using a plurality of stochastically altered versions of the machine learning model to produce a plurality of classification results. Example system 100 may additionally include a calculation module 110 that calculates a variance of the plurality of classification results. Example system 100 may also include a classifying module 112 that classifies the sample based at least in part on the variance of the plurality of classification results. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or client 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate trichotomous malware classification. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as set of samples 122 and machine learning model 124. Set of samples 122 generally represents any type or form of data that may be used as input for machine learning (e.g., to train a machine learning classifier and/or to be classified by a machine learning classifier).

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a client 206 via a network 204. In one example, all or a portion of the functionality of modules 102 may be performed by computing device 202, client 206, and/or any other suitable computing system. As will be described in greater detail below, one or more of modules 102 from FIG. 1 may, when executed by at least one processor of computing device 202 and/or client 206, enable computing device 202 and/or client 206 to classify potential malware (e.g., trichotomously: as malicious, benign, or uncertain). For example, and as will be described in greater detail below, one or more of modules 102 may cause computing device 202 and/or client 206 to classify a sample 222 (e.g., client 206 may have observed sample 222 and sent sample 222 to computing device 202 for classification). For example, and as will be described in greater detail below, identification module 104 may identify sample 222 potentially representing malware. Selection module 106 may select a machine learning model 124 trained on a set of samples 122 to distinguish between malware samples and benign samples. Analysis module 108 may analyze sample 222 using stochastically altered versions 230 of machine learning model 124 to produce classification results 240. Calculation module 110 may calculate a variance 250 of classification results 240. Classifying module 112 may classify sample 222 based at least in part on variance 250 of classification results 240.

Computing device 202 generally represents any type or form of computing device capable of reading computer-executable instructions. For example, computing device 202 may represent a security server that receives queries with samples (e.g., from client-side anti-malware systems) and provides classifications and/or instructions in response. In some examples, computing device 202 may represent a system used by a security vendor to analyze malware and detect new potential threats. Additional examples of computing device 202 include, without limitation, security servers, application servers, web servers, storage servers, and/or database servers configured to run certain software applications and/or provide various security, web, storage, and/or database services. Additionally or alternatively, computing device 202 may represent one or more desktops, laptops, tablets, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. Although illustrated as a single entity in FIG. 2, computing device 202 may include and/or represent a plurality of servers that work and/or operate in conjunction with one another.

Client 206 generally represents any type or form of computing device that is capable of identifying, executing, analyzing, remediating, and/or transmitting samples of malware. Additional examples of client 206 include, without limitation, desktops, laptops, tablets, cellular phones, Personal Digital Assistants (PDAs), multimedia players, embedded systems, wearable devices (e.g., smart watches, smart glasses, etc.), gaming consoles. Although illustrated as a single entity in FIG. 2, client 206 may include and/or represent a plurality of servers that work and/or operate in conjunction with one another.

Network 204 generally represents any medium or architecture capable of facilitating communication or data transfer. In one example, network 204 may facilitate communication between computing device 202 and client 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for trichotomous malware classification. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a sample potentially representing malware. For example, identification module 104 may, as part of computing device 202 in FIG. 2, identify sample 222 potentially representing malware.

The term "malware," as used herein, generally refers to any malicious, unauthorized, and/or illegitimate software and/or data object that may operate within and/or interact with a computing device. Examples of malware may include, without limitation, Trojans, spyware, adware, worms, rootkits, and/or viruses. In some embodiments, malware may perform malicious actions including but not limited to disrupting the function of a computing device, deleting files, encrypting files, stealing private information, transmitting private information, making unauthorized use of computing resources, launching and/or participating in attacks on other computing systems, and/or recording activity.

The term "sample," as used herein, generally refers to any observation of potential malware. In some examples, a sample may include and/or be represented by a software and/or data object. Additionally or alternatively, a sample may include a signature derived from a software and/or data object. In some examples, a sample may include a set of characteristics of a software and/or data object. For example, a sample may include a feature vector of a software and/or data object. In some examples, a sample may include behavioral information observed in connection with one or more files, programs, services, data locations, network addresses, and/or computing systems. In some examples, a sample may include a combination of the foregoing information. In some examples, samples may represent potential malware according to a predefined and/or uniform format (e.g., such that identical features of two potential instances of malware may be represented as identical within the two corresponding samples).

Identification module 104 may identify the sample in any of a variety of contexts. For example, identification module 104 may identify the sample by receiving the sample from a client device (e.g., as part of a query regarding whether the sample represents malware and/or a request for instructions for a security system operating on the client device) at, e.g., a security server. In some examples, identification module 104 may identify the sample within a database of samples (e.g., collected from one or more client devices over a period of time). In some examples, identification module 104 may, while operating on a computing device (e.g., as a part of a security system for the computing device) identify the sample as on the computing device and/or in an interaction with the computing device.

FIG. 4 illustrates an example system 400. Using FIG. 4 as an example of step 302, identification module 104 may identify a sample 402.

Returning to FIG. 3, at step 304, one or more of the systems described herein may select a machine learning model trained on a set of samples to distinguish between malware samples and benign samples. For example, selection module 106 may, as part of computing device 202 in FIG. 2, select machine learning model 210 trained on set of samples 122 to distinguish between malware samples and benign samples.

The phrase "machine learning model," as used herein, generally refers to any technique for computer-enabled empirical assessments. For example, the phrase "machine learning" may refer to one or more learning techniques for analyzing future inputs based on an analysis of training data. As used herein, the term "model" may refer to any algorithm, formula, rule, module, and/or filter for modeling a set of inputs to classify, label, categorize, rate, score, and/or extract one or more features from one or more future inputs. Accordingly, the phrase "machine learning model" may refer to any model and/or classifier generated, defined, and/or configured at least in part by a machine learning technique. In some examples, the machine learning model may use and/or approximate one or more deep learning techniques. For example, the machine learning model may use multiple processing layers (e.g., in which each layer provides output used as input for the subsequent layer). In some examples, the machine learning model may extract one or more features observed from the set of samples (e.g., rather than relying only on operator-defined features of the input data) that, when used to describe samples, provide both an accurate fit and a robust generalization of the samples.

The term "benign sample," as used herein, generally refers to any sample of benign, authorized, trusted, and/or legitimate software and/or data object that may operate within and/or interact with a computing device.

In one embodiment, the machine learning model may include a neural network. For example, the machine learning model may include a neural network. In some examples, the machine learning model may include and/or approximate a Bayesian neural network. In some examples, the neural network may include one or more hidden layers. In some examples, nodes within the neural network may apply a non-linear function (e.g., a transfer function) to the input of the neural units (e.g., after combining inputs from a preceding layer using a linear function). In some examples, selection module 106 may select a neural network that had dropout regularization applied when the neural network was trained. Additionally or alternatively, selection module 106 may have trained the neural network and applied dropout regularization (e.g., by stochastically masking and/or removing neural units) when training the neural network. For example, selection module 106 may have trained the neural network to perform a binary classification (e.g., malicious or benign) of each sample while applying a dropout mask with a fixed drop probability at each hidden layer.

In one example, the machine learning model may include a gradient tree boosting model. For example, the machine learning model may include an XGBoost forest model. In some examples, the machine learning model may include a random forest model.

Selection module 106 may select the machine learning model in any of a variety of ways. For example, selection module 106 may identify the machine learning model as a model for classifying potential malware. In some examples, selection module 106 may have generated the machine learning model (and/or directed the generation of the machine learning model). In some examples, the machine learning model may represent a pre-existing model (e.g., that was generated before the deployment and/or use of one or more of the systems described herein but which may be used by one or more of the systems described herein to perform and/or improve trichotomous classification of potential malware samples).

Using FIG. 4 as an example of step 304, selection module 106 may select a machine learning model 410.

Returning to FIG. 3, at step 306, one or more of the systems described herein may analyze the sample using a plurality of stochastically altered versions of the machine learning model to produce a plurality of classification results. For example, analysis module 108 may, as part of computing device 202 in FIG. 2, analyze sample 222 using stochastically altered versions 230 of machine learning model 210 to produce classification results 240.

The term "classification result," as used herein, generally refers to any classification, label, categorization, rating, scoring, and/or probability assessment that describes a sample. In some examples, the machine learning model may produce classification results indicating whether a sample is malware (e.g., resembles malware samples from the training set used to train the machine learning model) or benign (e.g., resembles benign samples from the training set used to train the machine learning model). For example, the machine learning model may produce, with any given sample as input, an output indicating the assessed probability that the sample represents malware rather than a benign object. Additionally or alternatively, the machine learning model may produce a score along a maliciousness dimension (e.g., where a lower score indicates a better fit with observed benign samples and a higher score indicates a better fit with observed malicious samples).

The term "stochastically altered version" as it relates to a machine learning model may refer to any randomness-driven modification, filtering, masking, lesioning, mapping, and/or removal of one or more elements of the machine learning model (e.g., such that the machine learning model may produce a different classification result with a given input). In some examples, a stochastically altered version of a machine learning model may include a copy of the machine learning model that has been altered. Additionally or alternatively, a stochastically altered version of a machine learning model may include the machine learning model being applied through a filter that modifies that operation of the machine learning model (e.g., before the application of the machine learning model to inputs and/or in real time as the machine learning model is applied to inputs).

Analysis module 108 may analyze the sample using plurality of stochastically altered versions of the machine learning model in any of a variety of ways. For example, analysis module 108 may create multiple copies of the machine learning model and make random modifications to each copy. Analysis module 108 may then provide the sample as input to each modified copy of the machine learning model. Additionally or alternatively, analysis module 108 may randomly generate masks for the machine learning model. Analysis module 108 may then repeatedly provide the sample to the machine learning model, applying one of the randomly generated masks at each iteration. In some examples, analysis module 108 may randomly alter the operation of the machine learning model as the machine learning model is applied to each sample. For example, analysis module 108 may, with a fixed probability (e.g., 10 percent, 20 percent, 50 percent, etc.), alter the operation of each processing unit of the machine learning model as the processing unit is activated.

As described earlier, in some examples the machine learning model may include a neural network. In these examples, analysis module 108 may analyze the sample using the plurality of stochastically altered versions of the machine learning model to produce the plurality of classification results by generating the plurality of stochastically altered versions of the machine learning model and providing the sample as input to the plurality of stochastically altered versions of the machine learning model. In this example, analysis module 108 may generate the plurality of stochastically altered versions of the machine learning model by applying, for each stochastically altered version of the machine learning model within the plurality of stochastically altered versions of the machine learning model, a dropout mask randomly generated for the stochastically altered version of the machine learning model. For example, analysis module 108 may randomly remove a subset of neural units and/or connections from the neural network (e.g., for each stochastically altered version, randomly removing half of the neural units, randomly removing each neural unit with a probability of 50 percent, or any other suitable approach). In some examples, the neural network may approximate a probabilistic deep Gaussian process and thereby provide an estimate of the uncertainty of the neural network outputs. However, the neural network may operate more efficiently than the probabilistic deep Gaussian process.

As described earlier, in some examples, the machine learning model may include a gradient tree boosting model. For example, the machine learning model may include an XGBoost forest model. In these examples, analysis module 108 may analyze the sample using the plurality of stochastically altered versions of the machine learning model to produce the plurality of classification results by generating the plurality of stochastically altered versions of the machine learning model and providing the sample as input to the plurality of stochastically altered versions of the machine learning model. Analysis module 108 may generate the plurality of stochastically altered versions of the machine learning model by, for each stochastically altered version of the machine learning model, randomly masking a subset of features within the stochastically altered version of the machine learning model. For example, analysis module 108 may randomly mark a fraction of all features flowing into internal and terminal nodes of an XGBoost forest model as "missing." The machine learning model may then handle missing values by using default directions (e.g., as handled in XGBoost).

As described earlier, in some examples, the machine learning model may include a random forest model. In these examples, analysis module 108 may analyze the sample using the plurality of stochastically altered versions of the machine learning model to produce the plurality of classification results by generating the plurality of stochastically altered versions of the machine learning model and providing the sample as input to the plurality of stochastically altered versions of the machine learning model. In one example, analysis module 108 may generate the plurality of stochastically altered versions of the machine learning model by (i) normalizing each feature within the random forest model to have zero mean and to have unit variance and (ii) for each stochastically altered version of the machine learning model within the plurality of stochastically altered versions of the machine learning model, randomly determining, for at least one split, to replace the use of a feature at the split with the use of a different feature within the machine learning model. For example, if the machine learning model typically handled a split in a tree with "feature5>3" (e.g., follow one branch if feature5 is greater than three, otherwise follow the other branch), analysis module 108 may, with a fixed probability, replace feature5 with a different feature (e.g., feature2), such that the split operates using "feature2>3" (e.g., follow one branch if feature2 is greater than three, otherwise follow the other branch).

Using FIG. 4 as an example of step 306, analysis module 108 may analyze sample 402 according to each of variants 430(1)-(n) of machine learning model 410 (e.g., by applying a stochastic mask 420 to machine learning model 410 to randomly produce differences in each variant). The application of sample 402 to variants 430(1)-(n) may yield results 440(1)-(n), respectively.

Returning to FIG. 3, at step 308, one or more of the systems described herein may calculate a variance of the plurality of classification results. For example, calculation module 110 may, as part of computing device 202 in FIG. 2, calculate variance 250 of classification results 240.

The term "variance," as used herein, generally refers to a statistical measurement of the variability within a data set. In some examples, the term "variance" may refer to statistical variance (i.e., the average of the squared differences of each number within the data set from the mean). In some examples, the term "variance" may refer to an approximation of statistical variance. In some examples, the term "variance" may refer to predictive variance. In some examples, the term "variance" may refer to a value derived from statistical variance (e.g., the standard deviation).

Calculation module 110 may calculate the variance in any suitable manner. For example, calculation module 110 may calculate the statistical variance within the plurality of results by calculating the mean of the plurality of results and then calculating the average of the differences of the results with the mean. In some examples, calculation module 110 may adjust the variance by adding the inverse of the model precision to the variance to calculate the predictive variance of the machine learning model for the sample. For example, calculation module 110 may calculate the model precision based at least in part on the probability that any given unit within the machine learning model was not dropped in any given variant (e.g., the model precision increasing linearly with the probability of not dropping a unit).

Using FIG. 4 as an example, at step 308 calculation module 110 may calculate a variance 460 of results 440(1)-(n).

Returning to FIG. 3, at step 310, one or more of the systems described herein may classify the sample based at least in part on the variance of the plurality of classification results. For example, classifying module 112 may, as part of computing device 202 in FIG. 2, classify sample 222 based at least in part on variance 250 of classification results 240.

Classifying module 112 may classify the sample based at least in part on the variance in any of a variety of ways. In some examples, classifying module 112 may classify the sample based at least in part on the variance of the plurality of classification results by classifying the sample as an uncertain sample rather than as a malware sample or a benign sample based on the variance exceeding a predetermined threshold. For example, classifying module 112 may first check whether the variance exceeds a predetermined threshold. If so, classifying module 112 may classify the sample as an uncertain sample (e.g., regardless of how the machine learning model would classify the sample). Otherwise, if the variance does not exceed the predetermined threshold, in some examples classifying module 112 may classify the sample simply based on the classification output of the machine learning model (e.g., by submitting the sample to an unaltered version of the machine learning model and/or by taking the mean of the classification results).

In some examples, classifying module 112 may classify the sample based at least in part on the variance of the plurality of classification results by (i) analyzing the sample using the machine learning model to produce a probability that the sample is a malware sample and (ii) determining that the probability that the sample is a malware sample falls within a probability window that is defined at least in part based on the variance of the plurality of classification results. For example, classification module 112 may calculate the standard deviation of the plurality of classification results (i.e., the square root of the variance) and obtain a probabilistic binary classification for the sample using the machine learning model (e.g., by submitting the sample to an unaltered version of the machine learning model and/or by taking the mean of the classification results). Classification module 112 may then determine whether the probabilistic binary classification falls within one standard deviation (or another specified number of standard deviations) of a predetermined threshold (e.g., dividing malicious from benign). If the probabilistic binary classification of the sample falls within one standard deviation of the predetermined threshold, classification module 112 may classify the sample as "uncertain." Otherwise, if the sample falls beyond one standard deviation of the threshold in the direction of maliciousness, classification module 112 may classify the sample as "malicious." If the sample falls beyond one standard deviation of the threshold in the direction of non-maliciousness, classification module 112 may classify the sample as "benign."

In some examples, systems described herein may include performing a security action in response to classifying the sample. The security action may include any of a variety of security actions. For example, where the sample is classified as "malicious" (or, in some cases, as "uncertain"), the security action may include deleting a file, quarantining a file, sandboxing a file and/or a process, blocking the execution of a program, terminating a process, blocking a network connection, blocking an input/output operation, performing a security scan, deploying a security barrier (e.g., adding a firewall restriction, deploying an authentication requirement, etc.), updating a security database with information about the sample, and/or alerting a user and/or an administrator. Where the sample is classified as "uncertain," the security action may include any of the foregoing actions. However, in some examples, the security action may include fewer security elements where the sample is classified as "uncertain" rather than "malicious." Additionally or alternatively, the security action may include less aggressive, restrictive, and/or disruptive security actions where the sample is classified as "uncertain" rather than "malicious." For example, the security action may include sandboxing a file classified as "uncertain" but deleting a file classified as "malicious." As another example, the security action may include imposing a higher level of firewall restrictions where the sample is classified as "malicious" and a lower level of firewall restrictions where the sample is classified as "uncertain." In some examples, the security action may include performing additional security scans and/or analyses where the sample is classified as "uncertain" (e.g., in an attempt to classify the sample with greater certainty). In this manner, the systems described herein may deploy more thorough and/or aggressive scans to confidently classify samples and conserve computing resources when more thorough and/or aggressive scans would be redundant or wasteful.

Using FIG. 4 as an example of step 310, classification module 312 may classify sample 402 based at least in part on variance 460 of results 440(1)-(n). In some examples, classification module 310 may classify 402 based in part on a result 450 of sample 402 being classified by machine learning model 410 and/or based in part on results 440(1)-(n) (e.g., a predictive mean of results 440(1)-(n)).

As explained above in connection with example method 300 in FIG. 3, a neural network with arbitrary depth, with non-linearities, and with dropout (e.g., random lesioning of weights) applied at every hidden layer, may be mathematically equivalent to an approximation to the probabilistic deep Gaussian process, which may serve as a robust uncertainty modeler. In some examples, such models may serve as computationally efficient implementations of Bayesian neural networks.

The systems described herein may build a Bayesian neural network for trichotomous malware classification using model uncertainty estimates to distinguish an "undecided" class. These systems may train the neural network model to perform binary classification using a dropout mask with drop probability p at every hidden layer. The model may optimize a binary cross-entropy loss via stochastic gradient descent methods. When a sample is applied to the neural network, these systems may obtain uncertainty values for the sample by using a Monte Carlo estimate of the model's predictive variance. To obtain these estimates, the systems described herein may run the model N times on the sample, each time with a stochastic dropout mask applied to the hidden layers. Then these systems may apply a heteroscedastic uncertainty formula to compute model uncertainty given the set of N outputs.

A user may decide upon a pre-defined uncertainty threshold below which model predictions will be accepted. At prediction time, if the model uncertainty for a sample exceeds the chosen threshold, the systems described herein may classify the sample as "undecided" and submit the sample for further inspection. Otherwise, the systems described herein may accept the model's probability estimate.

Figure 5:
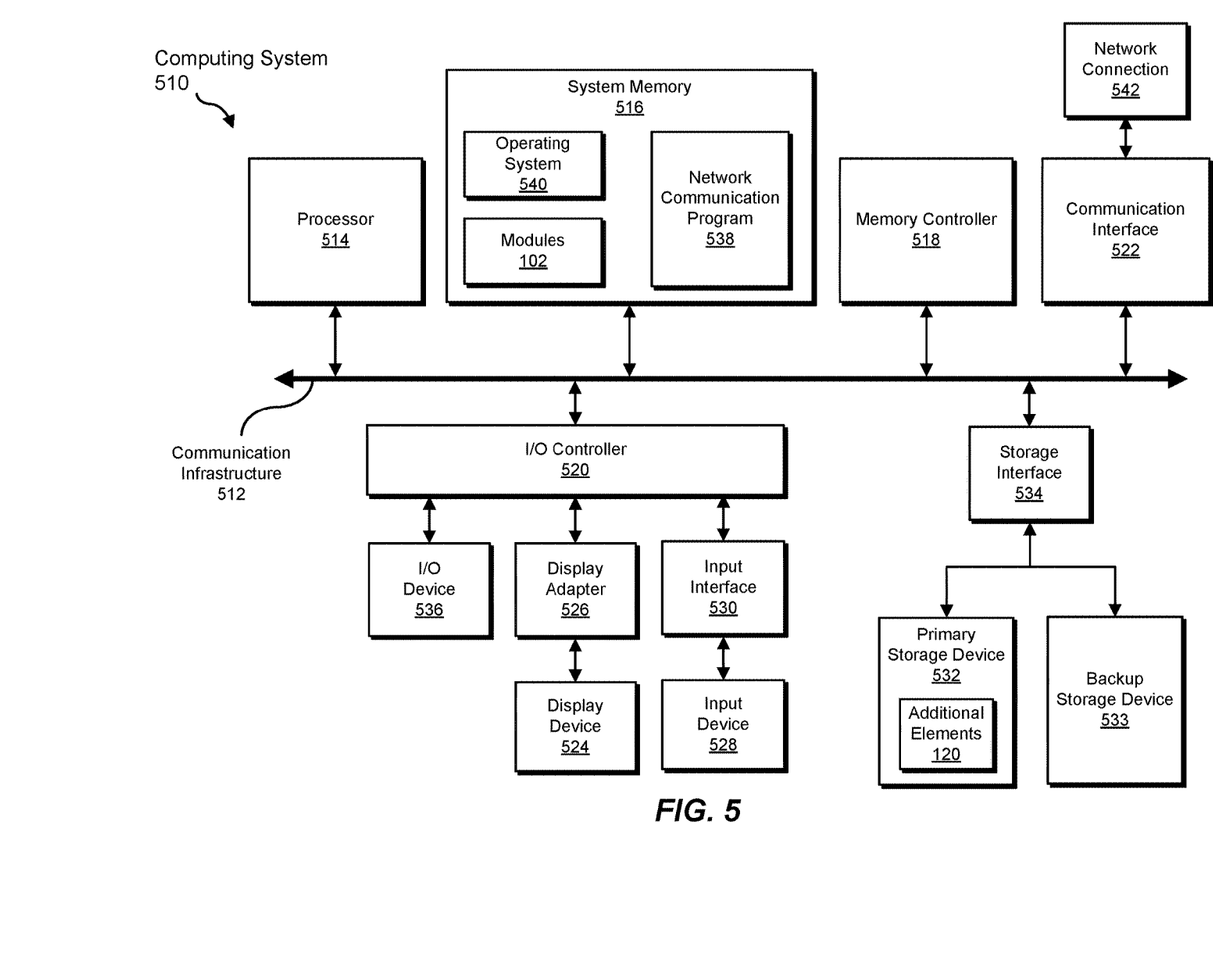
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, additional elements 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
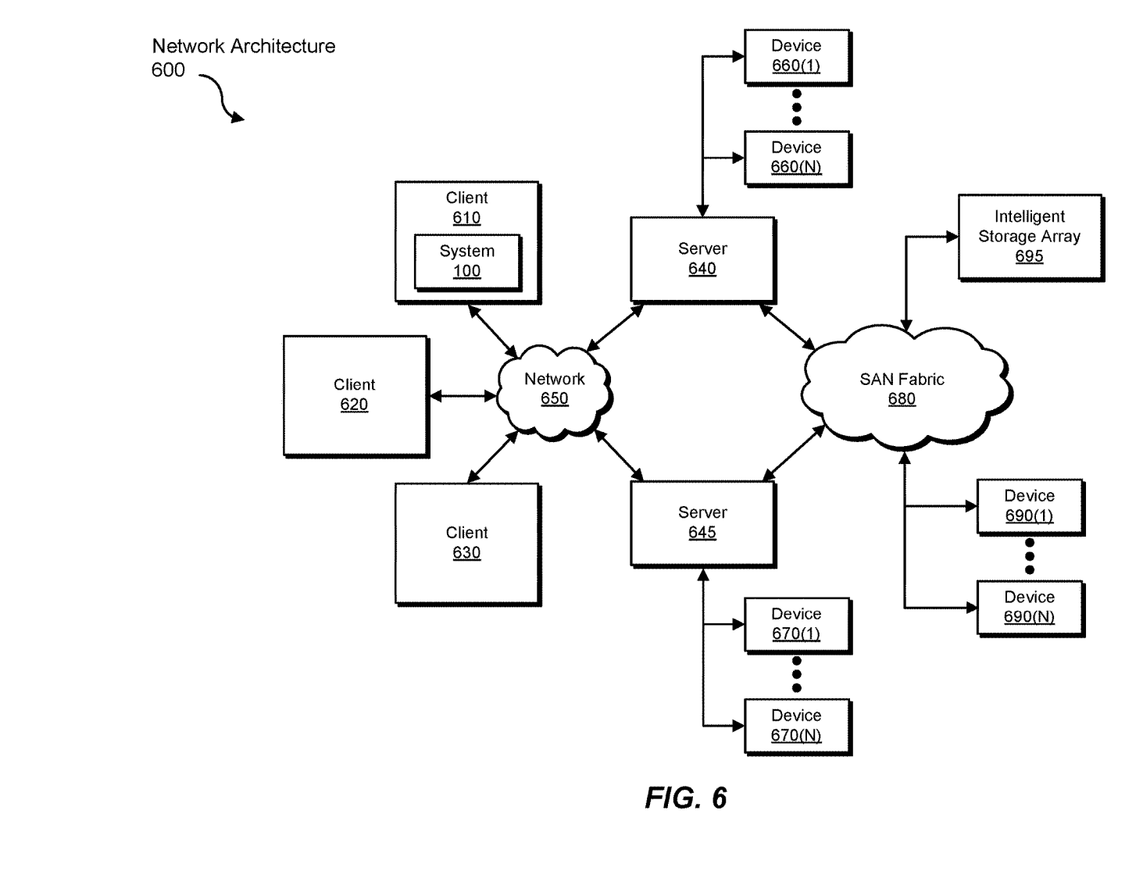
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for trichotomous malware classification.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a sample of potential malware to be transformed, transform the sample, output a result of the transformation to classify the sample of potential malware, use the result of the transformation to train a machine learning classifier and/or to determine the certainty with which the machine learning classifier classifies the sample, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for trichotomous malware classification, at least a portion of the method being performed by one or more computing devices comprising at least one processor, the method comprising:
    identifying a sample potentially representing malware;
    selecting a machine learning model trained on a set of samples to distinguish between malware samples and benign samples, the machine learning model including one or more independent processing units;
    analyzing the sample using a plurality of stochastically altered versions of the machine learning model to produce a plurality of classification results, wherein analyzing the sample includes applying the selected machine learning model through a filter that modifies the operation of the processing units of the machine learning model dynamically as the processing units are applied to the sample;
    calculating a variance of the plurality of classification results;
    adjusting the calculated variance by accessing a precision value associated with the machine learning model and adding an inverse of the precision value to the calculated variance to derive a predictive variance of the machine learning model for the sample; and
    trichotomously classifying the sample based at least in part on the predictive variance of the plurality of classification results.

2. The computer-implemented method of claim 1, further comprising performing a security action to protect the one or more computing devices in response to classifying the sample.

3. The computer-implemented method of claim 1, wherein classifying the sample based at least in part on the variance of the plurality of classification results comprises classifying the sample as an uncertain sample rather than as a malware sample or a benign sample based on the variance exceeding a predetermined threshold.

4. The computer-implemented method of claim 1, wherein classifying the sample based at least in part on the variance of the plurality of classification results comprises:
    analyzing the sample using the machine learning model to produce a probability that the sample is a malware sample; and
    determining that the probability that the sample is a malware sample falls within a probability window that is defined at least in part based on the variance of the plurality of classification results.

5. The computer-implemented method of claim 1, wherein the machine learning model comprises a neural network.

6. The computer-implemented method of claim 5, wherein training the neural network comprises applying dropout regularization when training the neural network.

7. The computer-implemented method of claim 5, wherein analyzing the sample using the plurality of stochastically altered versions of the machine learning model to produce the plurality of classification results comprises generating the plurality of stochastically altered versions of the machine learning model by applying, for each stochastically altered version of the machine learning model within the plurality of stochastically altered versions of the machine learning model, a dropout mask randomly generated for the stochastically altered version of the machine learning model.

8. The computer-implemented method of claim 1, wherein the machine learning model comprises a gradient tree boosting model.

9. The computer-implemented method of claim 8, wherein analyzing the sample using the plurality of stochastically altered versions of the machine learning model to produce the plurality of classification results comprises generating the plurality of stochastically altered versions of the machine learning model by, for each stochastically altered version of the machine learning model within the plurality of stochastically altered versions of the machine learning model, randomly masking a subset of features within the stochastically altered version of the machine learning model.

10. The computer-implemented method of claim 1, wherein the machine learning model comprises a random forest model.

11. The computer-implemented method of claim 10, wherein analyzing the sample using the plurality of stochastically altered versions of the machine learning model to produce the plurality of classification results comprises:
    normalizing each feature within the random forest model to have zero mean and to have unit variance; and
    for each stochastically altered version of the machine learning model within the plurality of stochastically altered versions of the machine learning model, randomly determining, for at least one split, to replace the use of a feature at the split with the use of a different feature within the machine learning model.

12. A system for trichotomous malware classification, the system comprising:
    an identification module, stored in a memory, that identifies a sample potentially representing malware;
    a selection module, stored in the memory, that selects a machine learning model trained on a set of samples to distinguish between malware samples and benign samples, the machine learning model including one or more independent processing units;
    an analysis module, stored in the memory, that analyzes the sample using a plurality of stochastically altered versions of the machine learning model to produce a plurality of classification results, wherein analyzing the sample includes applying the selected machine learning model through a filter that modifies the operation of the processing units of the machine learning model dynamically as the processing units are applied to the sample;
    a calculation module, stored in the memory, that calculates a variance of the plurality of classification results and adjusts the calculated variance by accessing a precision value associated with the machine learning model and adding an inverse of the precision value to the calculated variance to derive a predictive variance of the machine learning model for the sample;

a classifying module, stored in the memory, that trichotomously classifies the sample based at least in part on the predictive variance of the plurality of classification results; and at least one physical processor configured to execute the identification module, the selection module, the analysis module, the calculation module, and the classifying module.

13. The system of claim 12, further comprising a performing module, stored in memory, that performs a security action in response to classifying the sample.

14. The system of claim 12, wherein the classifying module classifies the sample based at least in part on the variance of the plurality of classification results by classifying the sample as an uncertain sample rather than as a malware sample or a benign sample based on the variance exceeding a predetermined threshold.

15. The system of claim 12, wherein the classifying module classifies the sample based at least in part on the variance of the plurality of classification results by:

analyzing the sample using the machine learning model to produce a probability that the sample is a malware sample; and determining that the probability that the sample is a malware sample falls within a probability window that is defined at least in part based on the variance of the plurality of classification results.

16. The system of claim 12, wherein the machine learning model comprises a neural network.

17. The system of claim 16, wherein the selection module further trains the neural network by applying dropout regularization when training the neural network.

18. The system of claim 16, wherein the analysis module analyzes the sample using the plurality of stochastically altered versions of the machine learning model to produce the plurality of classification results by generating the plurality of stochastically altered versions of the machine learning model by applying, for each stochastically altered version of the machine learning model within the plurality of stochastically altered versions of the machine learning model, a dropout mask randomly generated for the stochastically altered version of the machine learning model.

19. The system of claim 12, wherein the machine learning model comprises a gradient tree boosting model.

20. A non-transitory computer-readable medium comprising one or more computer-readable instructions that, when executed by at least one processor of a computing device, cause the computing device to:

identify a sample potentially representing malware;

select a machine learning model trained on a set of samples to distinguish between malware samples and benign samples, the machine learning model including one or more independent processing units;

analyze the sample using a plurality of stochastically altered versions of the machine learning model to produce a plurality of classification results, wherein analyzing the sample includes applying the selected machine learning model through a filter that modifies the operation of the processing units of the machine learning model dynamically as the processing units are applied to the sample;

calculate a variance of the plurality of classification results;

adjust the calculated variance by accessing a precision value associated with the machine learning model and adding an inverse of the precision value to the calculated variance to derive a predictive variance of the machine learning model for the sample; and trichotomously classify the sample based at least in part on the predictive variance of the plurality of classification results.

* * * * *